United States Patent
Schiff

[19]

[11] Patent Number: 6,023,337
[45] Date of Patent: Feb. 8, 2000

[54] SEE THROUGH LASER ALIGNMENT TARGET DEVICE

[75] Inventor: Tod F. Schiff, Portland, Oreg.

[73] Assignee: Schmitt Measurement Systems, Inc., Portland, Oreg.

[21] Appl. No.: 08/938,049

[22] Filed: Sep. 26, 1997

[51] Int. Cl.[7] .................................................. G01B 11/00
[52] U.S. Cl. ............................................................ 356/400
[58] Field of Search .............................. 356/152.1–152.3, 356/153, 138, 139, 139.01–141.5, 142–151, 399–401, 376, 375; 33/286, 290, 292

[56] References Cited

U.S. PATENT DOCUMENTS

| | | |
|---|---|---|
| 3,723,013 | 3/1973 | Stirland et al. . |
| 3,816,000 | 6/1974 | Fiedler . |
| 3,990,796 | 11/1976 | Foltz, Jr. . |
| 4,346,994 | 8/1982 | Cruz . |
| 4,483,618 | 11/1984 | Hamar . |
| 4,530,602 | 7/1985 | Pomphrey, Jr. . |
| 4,844,609 | 7/1989 | Floyd et al. . |
| 4,889,425 | 12/1989 | Edwards et al. . |
| 5,450,147 | 9/1995 | Dorsey-Palmateer . |

*Primary Examiner*—K P Hantis
*Attorney, Agent, or Firm*—Madison & Metcalf

[57] ABSTRACT

A target device for use in aligning a target station to a reference line-of-sight established by a laser alignment beam is mountably secured to the target station. The target device includes a tooling tube and a beam splitter for reflecting a portion of the alignment beam to a focusing objective. The focusing objective transmits the portion of the alignment beam to a position sensing detector for alignment measurement. The target device is designed to pivot about a target mount center reference point located in the tooling tube. The focusing objective and the beam splitter focus the image of the position sensing detector at the target mount center to produce a virtual image of the position sensing detector at the target mount center. By taking the alignment measurement at the target mount center, inaccurate measurements created by misalignment of the tooling tube with respect to the alignment beam are eliminated. The target device does not translate the alignment beam as it passes and is therefore suitable for use with multiple target devices.

24 Claims, 3 Drawing Sheets

SEE THROUGH LASER ALIGNMENT TARGET DEVICE

BACKGROUND OF THE INVENTION

1. The Field of the Invention

The present invention generally relates to optical laser alignment systems and more specifically to an improved target device for use in multiple target laser alignment systems.

2. Technical Background

Highly accurate laser systems have been developed for determining the relative alignment of a target station with respect to a reference point. Such systems incorporate a laser beam to establish a reference line-of-sight between the reference point and the target station. Alignment of the target station is then measured based on placement of the target station relative to the reference line-of-sight. When plural alignments between a single reference point and multiple target points are required, the use of a single target alignment system is impractical because it is time consuming to re-establish a reference line-of-sight at each of the individual target stations. As a result, alignment systems have been developed for accurately measuring the alignment of multiple targets. Multiple target alignment systems have greatly benefitted various types of industrial construction.

The methods and designs of multiple target alignment systems vary in complexity and design. In a typical design, a single laser beam and several target devices are utilized to measure the alignment with a reference line-of-sight. A target device is secured to each of the target stations. Different sites of construction pieces to be aligned are selected as target stations. An example would be the framing components of the fuselage of an airplane or bore holes in an engine block.

In one common design, the target device incorporates a cylindrical tooling tube through which the laser beam is directed. The tooling tube is secured in a target mount which is in turn secured to the target station. The target device further incorporates a beam splitter positioned in the tooling tube which reflects a portion of the laser beam at an angle relative to the reference line-of-sight. The target device incorporates a position sensing detector which receives the reflected portion of the laser beam. Based on where the reflected portion contacts the position sensing detector, the alignment of the target device relative to the reference line-of-sight is determined. In this manner, the target device is able to measure the displacement of the target station relative to the laser beam. The remainder of the laser beam passes onward to another target device which reflects another portion of the beam to determine the alignment of that target device. Thus, the alignment of a plurality of target stations may be determined by using a single reference line-of-sight established by the laser beam.

In mounting the target device to the target station care must be taken to ensure that the target device is positioned perpendicular to the laser beam. To the extent the target device is not perpendicular to the laser beam, the alignment measurement will be inaccurate. This is because the beam proceeds at an improper angle relative to the target device. Thus, when the beam contacts the beam splitter, the reflected portion of the beam is directed along an improper course, and consequently, contacts an inaccurate location on the position sensing detector. Improper angle alignment between the beam and the target device frequently occurs when the target device is placed in a target mount. In practice, an extra preparation step is required to ensure that the target device is indeed perpendicular to the alignment beam. This necessary alignment step is time consuming and introduces a potential for human error into the measurement.

Another concern in using multiple target devices is the ability to pass and return the laser beam through the target device without translating the beam. Returning a laser beam through a target device is a practice used in some laser targeting systems. If the laser beam is translated, then it will no longer provide an accurate reference line-of-sight for other target devices. Accordingly, a target device for use in a multiple target device system must pass and return a laser beam without translation.

Thus, it would be an advancement in the art to provide a see-through target device for multiple target alignment systems which eliminates alignment inaccuracies based on pivotal movement or imperfect mounting of the target device.

It would be a further advancement in the art to provide such a target device for multiple target alignment systems which passes and returns the laser beam without translation.

It would be another advantage advancement in the art to provide such a target device for multiple target alignment systems which is economical to manufacture and accurately operate even by persons having relatively little skill or training.

Such a device is disclosed and claimed herein.

BRIEF SUMMARY AND OBJECTS OF THE INVENTION

The present invention is a target device to be used in aligning a target station to a reference line-of-sight established by a laser alignment beam. The target device is designed to receive and pass an alignment beam without translating the beam to thereby allow accurate alignment measurements by other target devices. The target device is mounted to a target station and optically measures the alignment of its respective target station to the reference line-of-sight.

The target device comprises a tooling tube which is mountably secured to the target station. The tooling tube has an interior through which the alignment beam is projected. Located midway along the length of the tooling tube and at the cross-sectional center is a target mount center which serves as a reference point. The target device is designed to pivot about the target mount center when the tooling tube is secured to the target station.

The target device further comprises a housing structure secured to the tooling tube and having an interior through which the alignment beam is projected. A beam splitter is disposed along the reference line-of-sight within the interior of the housing structure and receives the alignment beam. The beam splitter transmits a portion of the alignment beam along the established reference line-of-sight while simultaneously reflecting a reflected portion of the alignment beam. A focusing objective is disposed in the interior of the housing structure and receives the reflected portion of the alignment beam. The focusing objective transmits the reflected portion of the alignment beam to a position sensing detector. The position sensing detector receives the reflected portion of the alignment beam to generate an electrical signal indicative of the alignment of the target station relative to the reference line-of-sight.

The focusing objective is positioned in a fixed relationship to the beam splitter and the position sensing detector so as to focus the image of the position sensing detector at the target mount center. This produces an image of the position sensing detector at the location of the target mount center. In operation, the alignment beam intercepts the image of the detector at a virtual location and the reflected portion of the alignment beam intercepts the detector at a location which is represented by the virtual location. Thus, the position sensing detector measures the alignment as if it were located at the target mount center.

In conventional operation, the tooling tube must be precisely perpendicular with the alignment beam so as to prevent translation of the reflected portion of the alignment beam and to thereby produce an inaccurate alignment measurement. By taking the alignment measurement at the target mount center such translations no longer effect alignment measurements. Thus, the tedious step of properly aligning the tooling tube is eliminated thereby speeding up the measurement process and providing greater convenience to the operator.

Thus it is an object of the invention to provide an improved laser alignment target device which provides imaging of the detector to thereby eliminate translations in the alignment beam based on pivotal movement and imperfect mounting of the target device.

This and other objects and advantages of the present invention will become more fully apparent by examination of the following description of the preferred embodiments and the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide a selected embodiment of the invention and are not therefore to be considered limiting of its scope, the invention will be described and explained with additional specificity and detail through the use of the accompanying drawings in which.

DESCRIPTION OF THE PREFERRED EMBODIMENTS

Figure 1:
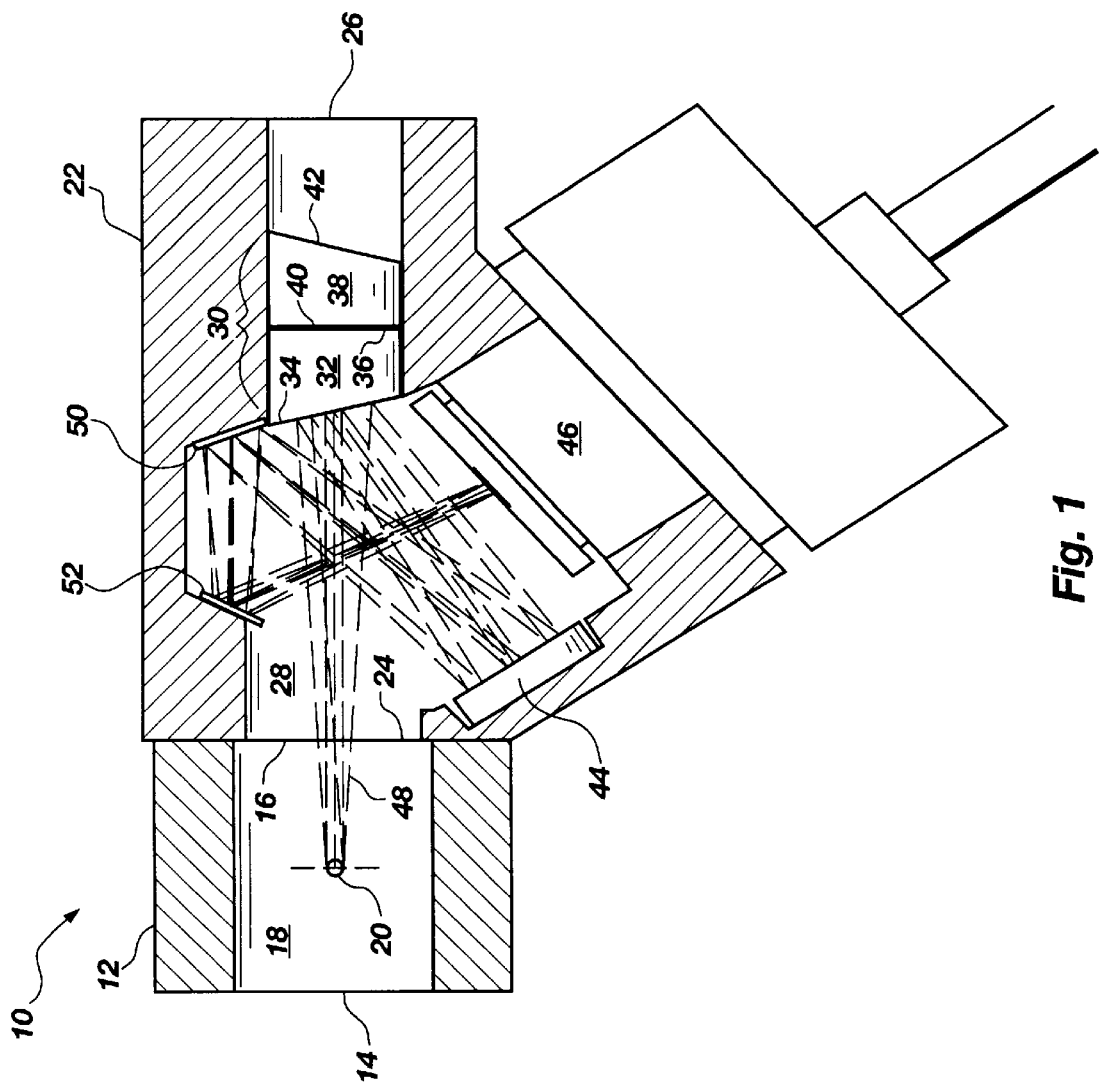
FIG. 1 is a cross-sectional side view of one embodiment of the target device of the present invention.
Figure 2:
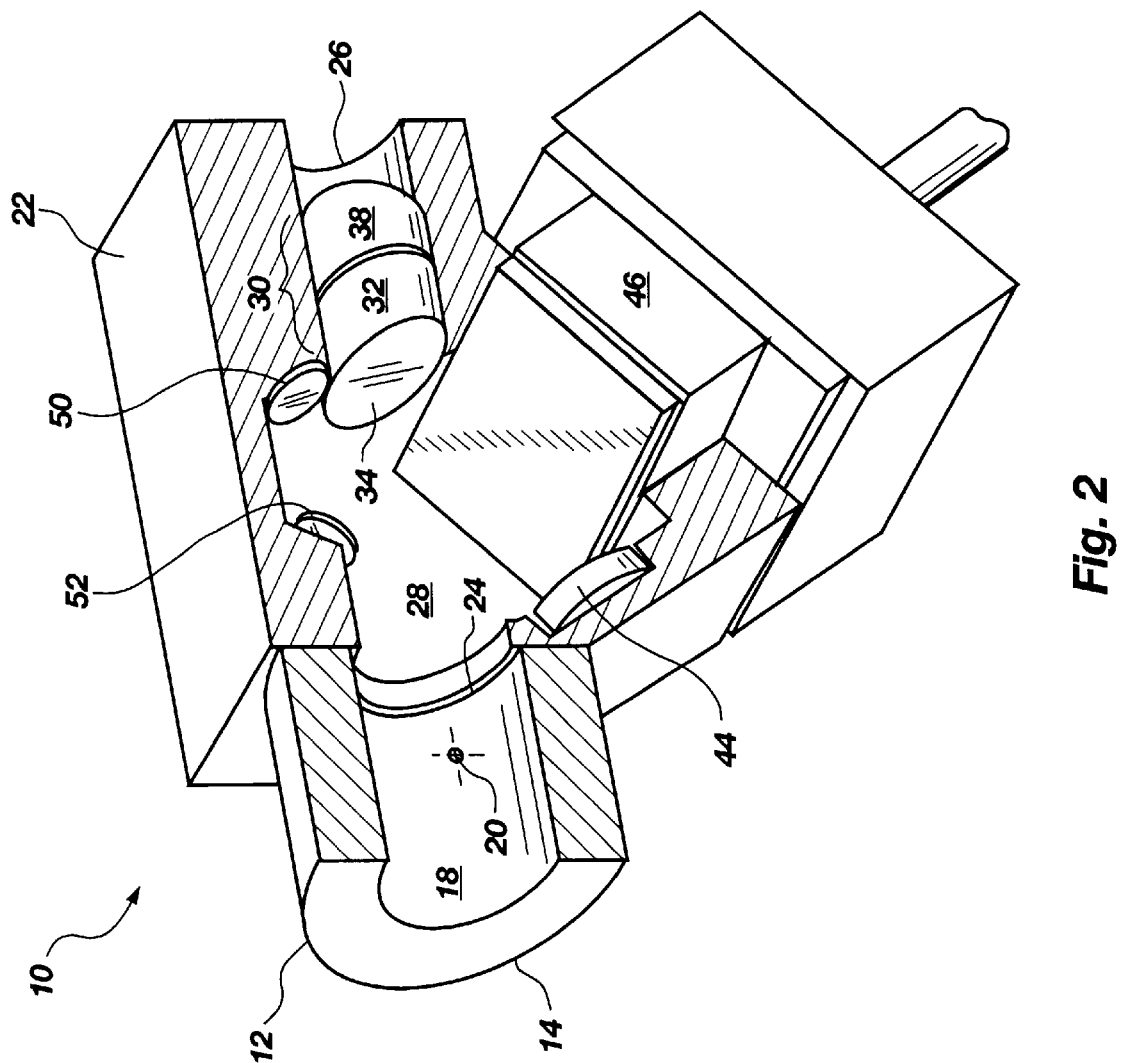
FIG. 2 is a cross-sectional perspective view of one embodiment of the target device of the present invention.

Reference is now made to the figures wherein like parts are referred to by like numerals throughout. With particular reference to FIGS. 1 and 2, a see through laser alignment target device of the present invention is shown and is generally designated 10. The target device 10 is for detecting the misalignment of a respective target station relative to a reference line-of-sight established by an alignment beam. The alignment beam is produced by a laser light source or any type of suitable beam generator. In one presently preferred embodiment, the alignment beam is a narrow monochromatic, collimated coherent beam. In an alternative embodiment, the alignment beam may have an autocollimated feature as will be explained subsequently.

The target device 10 comprises a tooling tube 12 of a type commonly known and used in the art. The tooling tube 12 is hollow and cylindrical in shape with a length of 2 inches and a diameter of 2 and ¼. These dimensions are presently established by an exact standard in the industry. The tooling tube 12 has a proximal end 14, a distal end 16, and a hollow interior 18 through which the alignment beam passes. The tooling tube 12 further has a longitudinal axis which substantially coincides with the reference line-of-sight. The tooling tube 12 is mountably secured in fixed relationship to a target station. The target station is the site at which the alignment measurement is to be taken. The tooling tube 12 is secured to the target station by a target mount (not shown) which is then secured to the target station.

The tooling tube 12 has a target mount center 20 which is a reference point located at the cross-sectional center of the interior 18 and approximately midway along the length of the tooling tube 12. As stated previously, the tooling tube 12 is positioned relative to the target station by use of the tooling mount. The tooling mount offers some degree of rotational movement about the target mount center 20. Thus, as the tooling tube 12 rotates the target mount center 20 remains stationary. The target mount center 20 serves as an important reference point for directing the alignment beam as will be later explained.

The target device 10 further comprises a housing structure 22 having a proximal end 24, a distal end 26, and a hollow interior 28. The proximal end 24 of the housing structure 22 is secured to the distal end 16 of the tooling tube 12 to thereby allow the interior 18 of the tooling tube 12 to communicate with the interior 28 of the housing structure 22 and to provide passage of the alignment beam. The interior 28 of the housing structure 22 is preferably coated with a coating, such as a black anodize coating, to reduce scattered light reflections.

A beam splitter 30 is disposed in a fixed relationship in the interior 28 of the housing structure 22 to receive the alignment beam. The beam splitter 30 is positioned at an angle relative to the reference line-of-sight established by the alignment beam. The beam splitter 30 is designed to transmit a portion of the alignment beam substantially along the established reference line-of-sight.

In one presently preferred embodiment, the beam splitter 30 comprises a reflecting window 32 which has a proximal surface 34 and a distal surface 36. The reflecting window 32 transmits a portion of the alignment beam and reflects a reflected portion of the alignment beam. The transmitted portion may be used by an additional laser alignment target device to determine the alignment of its respective target station. The reflecting window 32 simultaneously reflects a reflected portion of the alignment beam at an angle relative to the reference line-of-sight. The reflected portion of the alignment beam is used to derive the alignment of the target station relative to the reference line-of-sight. Materials and dimensions for a suitable reflecting window 32 are well known in the art.

In one embodiment the reflecting window 32 comprises a pellicle which is a one micron thick plastic. A pellicle has the advantage of not refracting the transmitted portion of the alignment beam. However, a pellicle is far to delicate for practical applications outside of controlled laboratory environments. Thus, in one presently preferred embodiment, the reflecting window 32 has a width which provides sufficient structural strength. The additional width inevitably results in a slight refraction of the transmitted portion of the alignment beam. Such refractions can prevent accurate alignment measurements by subsequent target devices utilizing the same alignment beam. Thus, in one presently preferred embodiment correction means are employed to offset such refraction.

In one presently preferred embodiment, the beam splitter 30 further includes a refraction offset correction window 38 which has a proximal surface 40 and a distal surface 42 and is disposed at an angle relative to the reference line-of-sight. The refraction offset correction window 38 is disposed to receive the transmitted portion of the alignment beam after passing through the reflecting window 32. The refraction offset correction window 38 refracts the transmitted portion in such a way as to compensate for refraction resulting from the reflecting window 32. Thus, the transmitted portion passes through the reflecting window 32 and the refraction offset correction window 38 without any resulting translation. The refraction offset correction window 38 must be of a suitable width and angle to compensate for refraction in the reflecting window 32.

In one presently preferred embodiment, the reflecting window 32 and the refraction offset correction window 38 are formed from the same rectangular block of material. The block is cut in identical halves with the halves functioning as the reflecting window 32 and the refraction offset correction window 38. The reflecting window 32 and the refraction offset correction window 38 therefore have the same thickness and wedge shape. This allows the refraction offset correction window 38 to cancel refraction in the reflecting window 32 when placed adjacent to the reflecting window 32 in a rotated position as shown in FIG. 1.

As the alignment beam passes through the reflecting window 32 and the refraction offset correction window 38 the alignment beam loses a percentage of the beam due to reflections. In one presently preferred embodiment the reflecting window 32 and the refraction offset correction window 38 are coated with anti-reflection coating to reduce this loss. The proximal surface 34 of the reflecting window 32 provides the amount of desired reflection needed to form the reflected portion of the alignment beam. The proximal surface 34 of the reflecting window 32 is then left un-coated. The percentage picked off from the alignment beam to form the reflected portion depends on the material and dimensions chosen for the reflecting window 32. The distal surface 36 of the reflecting window 32 and the proximal and distal surfaces 40, 42 of the refraction offset correction window 38 are coated with the anti-reflection coating. The anti-reflection coating prevents reductions in the alignment beam and also acts to reduce scattered light.

The target device 10 further comprises a focusing objective 44 disposed in a fixed relationship in the interior 28 of the housing structure 22. The focusing objective 44 is set to receive the reflected portion of the alignment beam from the beam splitter 30 and to transmit the reflected portion. The focusing objective 44 may be a lens, mirror or other type of imaging optic. In one presently preferred embodiment the focusing objective 44 is a spherical mirror. The focusing objective 44 may utilize different focusing ratios but in one presently preferred embodiment a 1:1 focusing ratio is suitable.

A position sensing detector 46 is secured to the housing structure 22 for receiving the reflected portion of the alignment beam and for determining the x-y displacement of the alignment beam. In one presently preferred embodiment, the detector is a conventional continuous array but may also be a conventional discrete array. The position sensing detector 46 receives the reflected portion of the alignment beam and produces an electrical signal indicative of the alignment of the target station relative to the reference line-of-sight. This electrical signal then is used to provide a readable output to the user. Such position sensing detectors suitable for use with the present invention are well known in the art.

Inevitably, there will be some scattered light from passage of the alignment beam through both the reflecting window 32 and the refraction offset correction window 38. Accordingly, the reflecting window 32 and the refraction offset correction window 38 are disposed in the housing structure 22 to prevent scattered light from contacting the position sensing detector 38.

The focusing objective 44 and the beam splitter 30 are established in a fixed relationship to each other and to the position sensing detector 46 so as to focus the position sensing detector 46 at the target mount center 20. This is referred to herein as creating an image of the position sensing detector 46 at the target mount center 20. By focusing the position sensing detector 46 at the target mount center 20 it is possible to measure the alignment as if the position sensing detector 46 were located at the target mount center 20. Thus, the image is a representation of where the position sensing detector 46 is measuring alignment. The spatial relationship between the focusing objective 44, the position sensing detector 46, and the target mount center 20 is determined by the following fundamental equation: $1/f = 1/s_1 + 1/s_2$ wherein f is the focal length of the focusing objective, $s_1$ is the distance from the focusing objective 44 to the position sensing detector 46, and $s_2$ is the distance from the focusing objective 44 to the target mount center 20 where the position sensing detector 46 is to be focused. Thus, in FIGS. 1 and 2, $s_2$ is the distance from the focusing objective 44 to the beam splitter 30 and to the target mount center 20.

In one presently preferred embodiment, the focal length f is equal to 1 to keep the image the same size of the position sensing detector 46. The distances $s_1$ and $s_2$ also determine the magnification of the image of the position sensing detector 46. The relationship is set forth in the equation $m = s_2/s_1$ wherein m represents the multiplication factor for the image size. In one presently preferred embodiment, the image remains the same size of the position sensing detector 46 so the multiplication factor is equal to 1 and $s_2 = s_1$.

Once the focusing objective 44 and the position sensing detector 46 are in their approximate locations, precise focusing of the position sensing detector 46 is achieved by pivoting the focusing objective 44 relative to the target device 10 until the image is located at the target mount center 20. This is done before the tooling tube 12 is permanently attached to the housing structure 22. Once proper imaging is achieved, the focusing objective 44 is permanently fixed within the housing structure 22. The tooling tube 12 is then permanently attached to the housing structure 22.

In operation, the alignment beam intercepts the image of the position sensing detector 46 at a particular virtual location. The virtual location corresponds to a particular location on the position sensing detector 46. The alignment beam then intercepts the beam splitter 30 which reflects a reflected portion of the alignment beam to the focusing objective 44. The focusing objective 44 in turn reflects the alignment beam to the position sensing detector 46. The position sensing detector 46 receives the reflected portion at a location on its grid which is represented by the virtual location. Thus, the position sensing detector 46 measures alignment of the target station as if it were located at the target center mount 20.

In conventional see through laser alignment operation, the tooling tube 12 must be placed precisely perpendicular to the alignment beam. To the extent that perpendicular placement does not exist then improper translation of the alignment beam occurs in the target device 10. This is a consequence of the alignment beam transmitting through the target device 10 at an incorrect angle. The reflected portion is then transmitted from the beam splitter 30 at an incorrect angle as well. This results in the position sensing detector 46 receiving the reflected portion at an incorrect location thereby giving an inaccurate alignment measurement. In conventional practice, steps are taken to ensure that the tooling tube 12 is perpendicular to the alignment beam.

As stated previously, the tooling tube 12, and consequently the entire target device 10, rotates about the target mount center 20. By measuring the alignment of the target station at the location of the target mount center 20, the alignment is measured before the alignment beam is subject to an inaccurate translation. Thus, when alignment is measured at the target mount center 20, the tooling tube 12 does not need to be perpendicular to the alignment beam. The alignment beam must still pass through the target mount center 20 for an accurate alignment measurement. The position sensing detector 46 could be physically located at the location of the target mount center 20, but this would preclude use of the alignment beam by other laser alignment target devices and thus defeat the object of the invention.

With reference to FIG. 1, possible representative paths of the alignment beam are shown 48 as they travel from target mount center 20 to the position sensing detector 46. The various paths are possible depending on the angle between the tooling tube 12 and the alignment beam and can be achieved by pivoting the tooling tube 12 about the target mount center 20. The beam splitter 30 and the focusing objective 44 are positioned so that reflected portion of the alignment beam intercepts the position sensing detector 46 exactly where the alignment beam intercepts the target mount center 20. Thus, accurate alignment measurements are provided without a perpendicular alignment of the tooling tube 12 to the alignment beam. This allows a user to pivot the tooling tube 12 and about the target mount center 20 and still have the reflected portion hit the same location on the position sensing detector 46.

In one presently preferred embodiment, first and second flat mirrors 50, 52 are disposed in the interior 28 of the housing structure 22. The flat mirrors 50, 52 bend the path of the alignment beam to thereby allow the target device 10 to be more compact in size. The flat mirrors 50, 52 have no focusing effect on the alignment beam. As shown in FIGS. 1 and 2, the distance for $s_1$ is measured from the focusing objective 44, to the first flat mirror 50, to the second flat mirror 52, and to the position sensing detector. In an alternative embodiment, flat mirrors 50, 52 are eliminated entirely. In yet other alternative embodiments one or more than two flat mirrors may be incorporated to bend the alignment beam path as desired.

The target device 10 of the present invention is designed to be a see through target device which functions as if it were an end target device. Thus, the measurement results are as accurate as an end target, while still passing the beam to thereby allow multiple target use of the same alignment beam.

Figure 3:
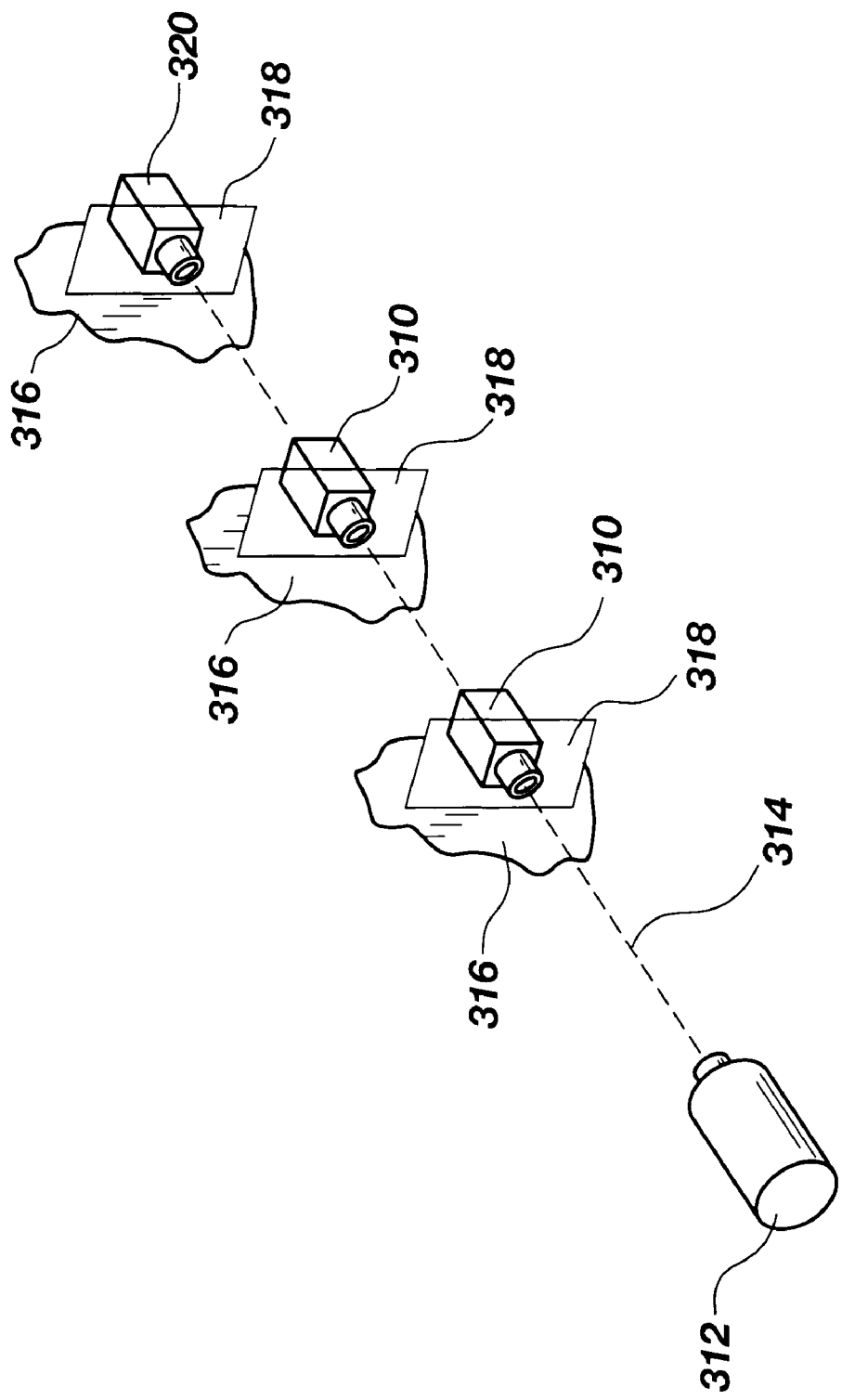
FIG. 3 is a perspective view of a plurality of the target devices of the present invention set to receive a reference line-of-sight alignment beam.

With reference to FIG. 3, a series of see through alignment target devices 310 of the present invention are shown. A beam generator 312 is used to produce a collimated laser alignment beam 314. Each target device 310 is mountably secured to a respective target station 316 by means of a target mount 318. The alignment beam 314 is directed through the series of target devices 310 to measure the alignment of each target station 316. The alignment beam terminates at an end target device 320. The end target device 320 is of a type commonly known in the art and does not pass the beam.

Each target device 310 takes a portion of the alignment beam 314 in order to perform its respective alignment measurement. For example, the first target device 310 passes the transmitted portion of the alignment beam 314 substantially along the reference line-of-sight as previously explained. A second target device 310 receives the transmitted portion and then transmits a transmitted subportion of the transmitted portion so that the transmitted subportion continues substantially along the established reference line-of-sight. The second target device 310 reflects a reflected subportion of the transmitted portion to a second detector. The second detector then generates an electrical signal which indicates alignment of the second target station relative to the reference line-of-sight. The end target device 320 receives the remaining portion of the alignment beam 314 after passing through all of the target devices 310. The end target device 320 uses the remaining portion of the of the alignment beam to intercept an end detector to generate an electrical signal which indicates alignment of the end target station relative to the reference line-of-sight.

The number of target devices 310 which may be serviced by a single alignment beam 314 is limited and depends on the percentage of the alignment beam 314 that each target device 310 takes. In operation, it is common for each target device 310 to take 8 to 10 percent of the alignment beam 314. With most end target devices, it is desirable to have 50 percent of the alignment beam 314 intercept the end target device for an accurate alignment measurement. Accordingly, in application, 4 to 5 see through target devices 310 may be serviced by a single alignment beam 314.

In one alternative embodiment, the alignment beam 314 is an autocollimated laser. Autocollimated lasers are well known in the art and have the ability to measure the angle of reflection when directed back to the source. In a system using an autocollimated laser, the end target device 320 is simply a mirror. This allows reflection of the autocollimated laser back to the source for angle and alignment measurement. The target devices 310 of the present invention allow the alignment beam 314 to reflect back without any significant translation of the alignment beam 314. Although the refraction offset correction window 38 refracts a return beam, the reflecting window 32 will correct that refraction in a returning alignment beam.

Accurate alignment measurements may be taken as each target device 310 passes a remaining portion of the alignment beam without translation. This allows the target device 310 to be "invisible" to the rest of the system's performance. Nevertheless, a target device 310 does reduce the amount of the alignment beam 314 so consideration must be made to the amount of target devices 310 which may be serviced by an alignment beam. The ability to focus an image of the position sensing detector 46 at the target mount center 20 provides for accurate alignment measurement without regard to alignment of the tooling tube 12 respective to the alignment beam 314. Thus, pivotal movement and imprecise mounting of the tooling tube 12 does not prevent accurate alignment measurement. The target device 310 of the present invention is therefore easier to operate and more resistant to human error.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated in the appended claims rather than by the foregoing description. All changes within the meaning and range of the claims are to be embraced within their scope.

What is claimed is:

1. A target device for detecting the misalignment of a target station relative to a reference line-of-sight established by an alignment beam, the target device comprising:
- a tooling tube defining a target mount center, wherein the tooling tube is securable in a fixed relationship to the target station such that the alignment beam may pass through the interior of the tooling tube;
- a housing structure having an interior and positioned in a fixed relationship to the tooling tube such that the alignment beam may pass through the interior of the housing structure;
- a beam splitter disposed in the interior of the housing structure along the reference line-of-sight to receive the alignment beam and to transmit a portion of the alignment beam substantially along the established reference line-of-sight while simultaneously reflecting a reflected portion of the alignment beam at an angle relative to the reference line-of-sight;
- a focusing objective positioned to receive the reflected portion of the alignment beam from the beam splitter; and
- a detector for receiving the reflected portion from the focusing objective to provide an electrical signal indicative of the planar displacement of the target station relative to the target mount center, wherein the focusing objective is positioned with respect to the beam splitter such that the focusing objective and the beam splitter create an image of the detector at the target mount center.

2. The target device of claim 1 wherein the focusing objective has a focal length (f) and the spatial relationship between the focusing objective, the detector, and the target mount is defined by the following equation:

$$1/f = 1/s_1 + 1/s_2$$

where $s_1$ is the distance from the focusing objective to the detector and $s_2$ is the distance from the focusing objective to the target mount center.

3. The target device of claim 1 wherein the tooling tube is a hollow cylindrical structure having a longitudinal axis which substantially coincides with the reference line-of-sight.

4. The target device of claim 3 wherein the beam splitter is disposed within the housing structure at an angle relative to the longitudinal axis.

5. The target device of claim 1 wherein the beam splitter comprises a reflecting window which simultaneously refracts the transmitted portion of the alignment beam and reflects the reflected portion of the alignment beam.

6. The target device of claim 5 wherein the beam splitter further comprises a correction window disposed within the housing structure for receiving the transmitted portion of the alignment beam and offsetting the refraction resulting from the reflecting window.

7. The target device of claim 1 further comprising at least one flat mirror disposed in the interior of the housing structure for receiving the reflected portion of the alignment beam from the focusing objective and transmitting the reflected portion of the alignment beam to the detector.

8. The target device of claim 1 wherein the focusing objective comprises a spherical mirror.

9. The target device of claim 1 further comprising a target mount secured to the target station and for receiving the tooling tube to thereby maintain the tooling tube in a fixed relationship to the target station.

10. A target system for optically detecting the alignment of a plurality of target stations including at least one intermediate target station positioned generally along a reference line-of-sight, said system comprising:
- a beam generator to form and project an alignment beam along the reference line-of-sight;
- a first target device mounted on the at least one intermediate target station, the first target device including
  - a tooling tube defining a target mount center and through which the alignment beam may pass,
  - a housing structure secured to the tooling tube and having an interior through which the alignment beam may pass,
  - a beam splitter, disposed within the interior of the housing structure along the reference line-of-sight, for receiving the alignment beam and for transmitting a portion of the alignment beam along the reference line-of-sight while simultaneously reflecting a reflected portion of the alignment beam,
  - a focusing objective, disposed within the interior of the housing structure, for receiving and transmitting the reflected portion of the alignment beam, and
  - a first detector for receiving the reflected portion of the alignment beam to generate a first electrical signal indicative of the planar displacement of the intermediate target station relative to the target mount center, wherein the focusing objective is positioned in a fixed relationship to the beam splitter such that the focusing objective and the beam splitter create an image of the first detector at the target mount center.

11. The target system of claim 10 wherein the focusing objective has a focal length (f) and the spatial relationship between the focusing objective, the first detector, and the target mount is defined by the following equation:

$$1/f = 1/s_1 + 1/s_2$$

where $s_1$ is the distance from the focusing objective to the first detector and $s_2$ is the distance from the focusing objective to the target mount center.

12. The target system of claim 10 wherein the beam splitter is disposed at an angle relative to the reference line-of-sight.

13. The target system of claim 10 wherein the beam splitter comprises a reflecting window which simultaneously refracts the transmitted portion of the alignment beam and reflects the reflected portion of the alignment beam.

14. The target system of claim 13 wherein the beam splitter further includes a correction window disposed in the interior of the housing structure for receiving the transmitted portion of the alignment beam and offsetting the refraction resulting from the reflecting window.

15. The target system of claim 10 wherein the first target device further includes at least one flat mirror disposed within the interior of the housing structure for receiving the reflected portion of the alignment beam from the focusing objective and transmitting the reflected portion of the alignment beam to the first detector.

16. The target system of claim 10 wherein the focusing objective comprises a spherical mirror.

17. The target system of claim 10 further comprising a second target device mounted on a second intermediate target station, wherein the second target device transmits a subportion of the transmitted portion such that the transmitted subportion continues substantially along the established reference line-of-sight, wherein the second target device reflects a reflected subportion of the transmitted portion to a second detector to generate an electrical signal indicative of the alignment of the second target device relative to the reference line-of-sight.

18. The target system of claim 10 further comprising a second target device mounted on an end target station for receiving the transmitted portion of the alignment beam and for intercepting at least a portion of the transmitted portion of the alignment beam with a second detector to generate a second electrical signal indicative of the alignment of the end target station relative to the reference line-of-sight.

19. A target system for optically detecting the alignment of a plurality of target stations positioned generally along a reference line-of-sight, said system comprising:
 a beam generator to form and project an alignment beam along the reference line-of-sight;
 a plurality of target devices each mounted on a respective target station, each target device including
  a tooling tube defining a target mount center and through which the alignment beam may pass,
  a housing structure secured to the tooling tube and having an interior through which the alignment beam may pass,
  a beam splitter disposed within the interior of the housing structure along the reference line-of-sight for receiving the alignment beam and for transmitting a portion of the alignment beam along the reference line-of-sight while simultaneously reflecting a reflected portion of the alignment beam,
  a focusing objective, disposed within the interior of the housing structure, for receiving the reflected portion of the alignment beam, and
  a detector for receiving the reflected portion of the alignment beam to generate an electrical signal indicative of the planar displacement of the target station relative to the target mount center, wherein the focusing objective is positioned in a fixed relationship to the beam splitter such that the focusing objective and the beam splitter create an image of the detector at the target mount center.

20. The target system of claim 19 wherein the focusing objective has a focal length (f) and the spatial relationship between the focusing objective, the detector, and the target mount center is defined by the following equation:

$$1/f = 1/s_1 + 1/s_2$$

where $s_1$ is the distance from the focusing objective to the detector and $s_2$ is the distance from the focusing objective to the target mount center.

21. The target system of claim 19 further comprising an end target device mounted on an end target station for receiving the alignment beam after passing through the plurality of target devices and for intercepting at least a portion of the alignment beam with an end detector to generate an end electrical signal indicative of the alignment of the end target station relative to the reference line-of-sight.

22. The target system of claim 19 wherein the beam splitter of each target device comprises a reflecting window which simultaneously refracts the transmitted portion of the alignment beam and reflects the reflected portion of the alignment beam.

23. The target system of claim 22 wherein the beam splitter of each target device further comprises a correction window disposed in the interior of the housing structure for receiving the transmitted portion of the alignment beam and offsetting the refraction resulting from the reflecting window.

24. The target system of claim 19 wherein each target device further includes at least one flat mirror disposed within the interior of the housing structure for receiving the reflected portion of the alignment beam from the focusing objective and transmitting the reflected portion of the alignment beam to the detector.

\* \* \* \* \*